A. T. MOORE.
TIRE BOOT CLAMP.
APPLICATION FILED JUNE 16, 1921.
1,414,969. Patented May 2, 1922.
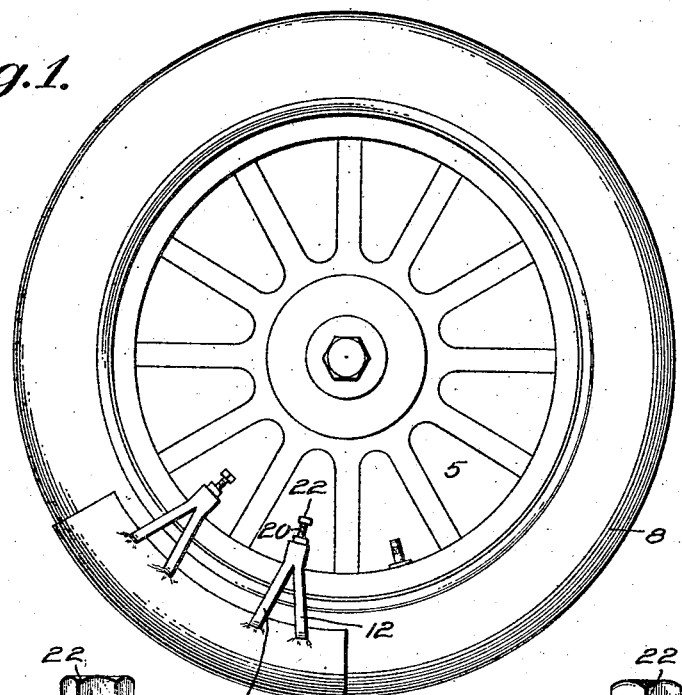
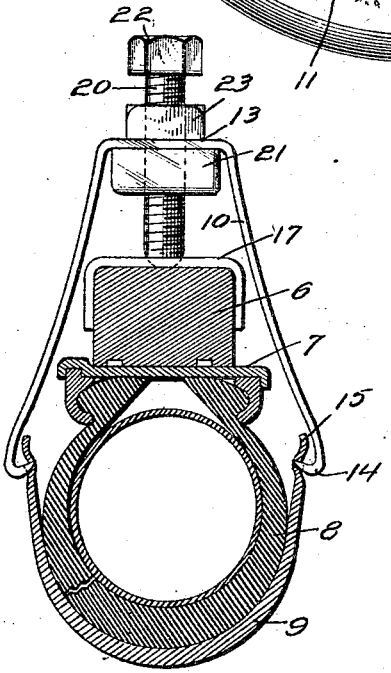
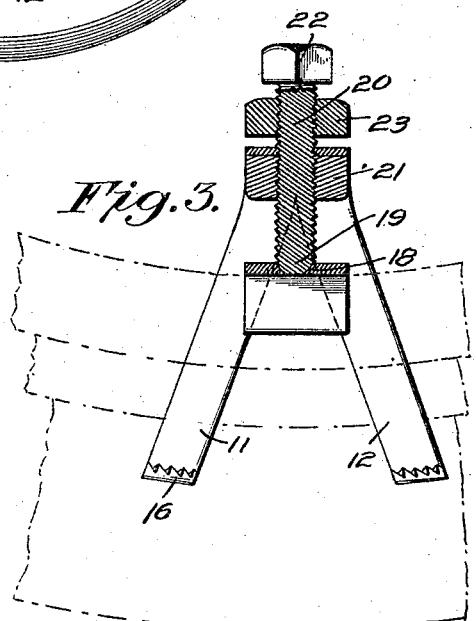
Inventor
A. T. Moore.
Geo. P. Kimmel, Attorney

UNITED STATES PATENT OFFICE.

AARON T. MOORE, OF OATMAN, ARIZONA.

TIRE-BOOT CLAMP.

1,414,969. Specification of Letters Patent. Patented May 2, 1922.

Application filed June 16, 1921. Serial No. 478,059.

*To all whom it may concern:*

Be it known that I, AARON T. MOORE, a citizen of the United States, residing at Oatman, in the county of Mohave and State of Arizona, have invented certain new and useful Improvements in Tire-Boot Clamps, of which the following is a specification.

This invention relates to a boot holder and more particularly to that class of removable devices adapted to be placed over a tire patch to protect the same and prevent a blowout.

The primary object of the invention resides in the construction of a boot holder for pneumatic, automobile tires which may be quickly clamped to the felly of the wheels and tightened to draw the boot into snug contact with the patch and tire, permitting the use of one or more clamps for this purpose depending on the size of the patch to be protected.

Another and very important object of the invention is the provision of a boot holder designed for use in connection with various size tires, and one in which the parts are extremely simple in construction, easily assembled, rigid and durable, highly efficient in operation, practical and capable of being manufactured at a very low cost whereby its commerical possibilities are greatly enhanced.

With these objects in view and others which will be manifest and suggested as the purpose and nature of my invention are revealed in the following specification and drawing, wherein I have shown a preferred embodiment thereof, Figure 1 is a side view of a motor vehicle wheel showing the boot holder in position on the tire.

Fig. 2 is a vertical section through the felly of a wheel and tire showing the boot holder in position.

Fig. 3 is a side view, the tire being shown in dotted lines.

Referring now to the drawings wherein like parts designate corresponding parts throughout the several views, 5 designates a motor vehicle wheel, 6 the felly and 7 the clincher rim for holding a pneumatic tire 8 all of which are of a well known and standard construction.

Referring now in particular to Fig. 2, wherein the tire is shown as punctured or fractured over which a tire patch is usually placed, the invention consists of a protector or boot adapted to snugly engage the tire and protect the patch from further wear in the manner now to be set forth in detail. The boot or protector 9 which embraces the major portion of the tire is adapted to be drawn into engaging position by a saddle 10, the arms 11, 12 of which extend downwardly on each side and from the horizontal top 13 and have their ends 14 bent inwardly and provided with prongs or other suitable means for gripping the boot 9 in proximity to the sides 15 thereof. The saddle above referred to, of course, bridges the felly 6 and the arms 11, 12 extending downwardly to grip the boot 9 which may if so desired consist of a section of an old tire so that the same may be gripped by the prongs 16 and the boot drawn into snug engagement with the pneumatic tire as above described.

A bearing plate 17 overlying the felly of the wheel is provided with a central groove 18 for receiving the rounded end 19 of a vertical clamping, threaded screw 20, said screw being provided with a nut 21 bearing against the top 13 of the saddle whereby the same is drawn upwardly upon rotation of the head 22 of the threaded screw, a locking collar 23 being also provided to prevent movement of the saddle when drawn in set position.

While I have shown the invention in use equipped with two clamping members, it will be of course apparent that the same may be used with but one of said clamping members. To protect a worn or ruptured tire and prevent possible blowouts, the boot 9 may extend for a considerable distance circumferentially of the tire and over the part to be protected so that a plurality of such clamping members may be required.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I claim as new and desire to secure by Letters Patent of the U. S. is:—

1. A boot holder of the class described comprising a resilient saddle having angularly directed arms on each side thereof, bridging the felly of the wheel, said arms having their inwardly bent ends provided with gripping prongs for attaching to a boot and screw threaded means tensioning the arms of the saddle for tightening the boot on the tire.

2. A boot holder of the class described comprising a resilient saddle having angularly directed arms on each side thereof, bridging the felly of a wheel, said arms having inwardly bent ends provided with gripping prongs for attachment to a boot, a screw threaded element and movable nut carried thereby adapted to bear against the bridging portion of the saddle, and a locking nut on said threaded element for retaining said saddle in its tensioned position when the boot is tightened on the tire.

In testimony whereof, I affix my signature hereto.

AARON T. MOORE.